US007787274B2

(12) United States Patent
Chang

(10) Patent No.: US 7,787,274 B2
(45) Date of Patent: Aug. 31, 2010

(54) POWER SUPPLY WITH ADJUSTABLE OUTPUTTED VOLTAGE

(76) Inventor: Li-Chih Chang, 3F No. 17, Lane 8, Sinjhong St., Taipei City 105 (TW)

( * ) Notice: Subject to any disclaimer, the term of this patent is extended or adjusted under 35 U.S.C. 154(b) by 378 days.

(21) Appl. No.: 12/112,414

(22) Filed: Apr. 30, 2008

(65) Prior Publication Data

US 2009/0273333 A1 Nov. 5, 2009

(51) Int. Cl.
*H02M 1/00* (2007.01)
*H02M 7/00* (2006.01)

(52) U.S. Cl. ...................................................... 363/146

(58) Field of Classification Search ................. 363/142, 363/143, 146, 147; 323/318; D13/110
See application file for complete search history.

(56) References Cited

U.S. PATENT DOCUMENTS 6,111,772 A * 8/2000 Lee et al. .................... 363/146
6,894,457 B2 * 5/2005 Germagian et al. ......... 320/119
7,054,177 B2 * 5/2006 Wu ............................ 363/146

* cited by examiner

*Primary Examiner*—Gary L Laxton
(74) *Attorney, Agent, or Firm*—Chung-Ming Shih; HDLS IPR Services

(57) ABSTRACT

A power supply with adjustable outputted voltage includes a casing, a circuit board, a voltage-adjusting knob and a rotary wheel. The casing is provided thereon with a window, and the circuit board is disposed in the casing. The circuit board is electrically connected to AC/DC power input processing circuit in which only AC (or DC) exists or both AC and DC exist simultaneously. The voltage-adjusting knob is electrically connected on the circuit board. The rotary wheel is provided thereon with a plurality of voltage-adjusting numerals. The voltage-adjusting numerals are located to correspond to the window of the casing and are displayed in the window.

12 Claims, 7 Drawing Sheets

POWER SUPPLY WITH ADJUSTABLE OUTPUTTED VOLTAGE

BACKGROUND OF THE INVENTION

1. Field of the Invention

The present invention relates to a power supply, and in particular to a power supply with adjustable outputted voltage.

2. Description of Prior Art

A power supply with dual-input power sources has an AC power input and a DC power input, and it converts these two inputted power sources into a DC voltage output for use. As a result, this kind of power supply can be used indoors or outdoors.

The means of adjusting the voltage outputted by the power supply with dual inputs shown in FIG. 1 is a slide switch that is operated by linear movement. A pushing button 10 of the switch is exposed to the outside of a casing 201 of the power supply 20. A voltage scale 202 is printed on the casing 201 at a position corresponding to the pushing button 10. When the user pushes the pushing button 10 linearly, he/she can adjust the voltage output. However, since all exposed numerals of the voltage scale 202 are of small size, the user may often read the wrong numeral and thus may push the pushing button 10 to the wrong position. Even, when the pushing button 10 is pushed in place, it may be located between two numerals. As a result, the user will get confused whether the adjusted voltage output is in a correct position.

SUMMARY OF THE INVENTION

In view of the above drawbacks, the present invention is to provide a way of adjusting the voltage by means of a rotary wheel. In this way, each time the user can read only one voltage-adjusting numeral, thereby avoiding the user from reading the wrong numeral.

The present invention provides a power supply with adjustable outputted voltage, which includes a casing, a circuit board, a voltage-adjusting knob and a rotary wheel. The casing is provided thereon with a window, and the circuit board is disposed inside the casing. The circuit board has cables for AC/DC power input processing circuit in which only AC (or DC) exists or both AC and DC exist simultaneously. The voltage-adjusting knob is electrically connected on the circuit board. The rotary wheel is provided thereon with a plurality of voltage-adjusting numerals. The voltage-adjusting numerals are located to correspond to the window of the casing and are displayed in the window.

DETAILED DESCRIPTION OF THE INVENTION

The technical contents and detailed description of the present invention will be described with reference to the accompanying drawings.

Figure 1:
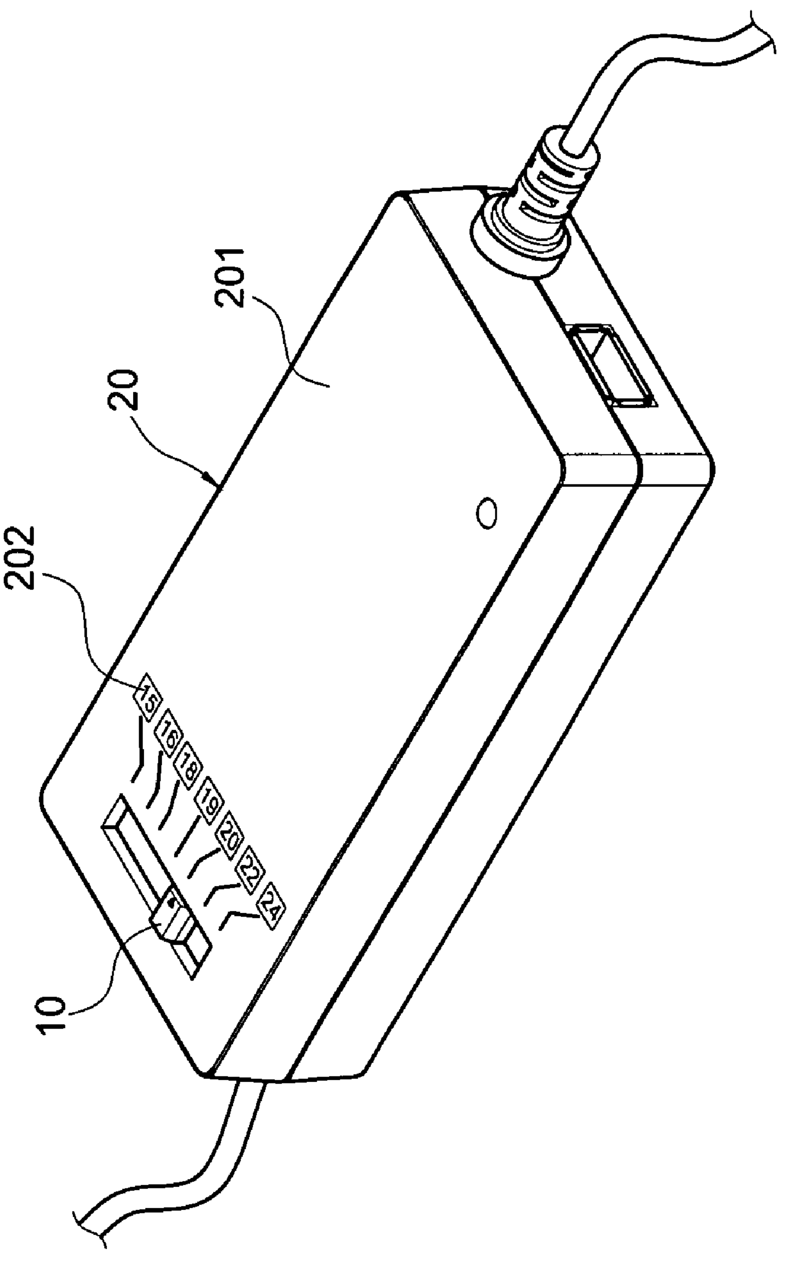
FIG.1 (Prior Art)
FIG. 1 is a schematic view showing the external appearance of a conventional power supply with adjustable outputted voltage.
Figure 2:
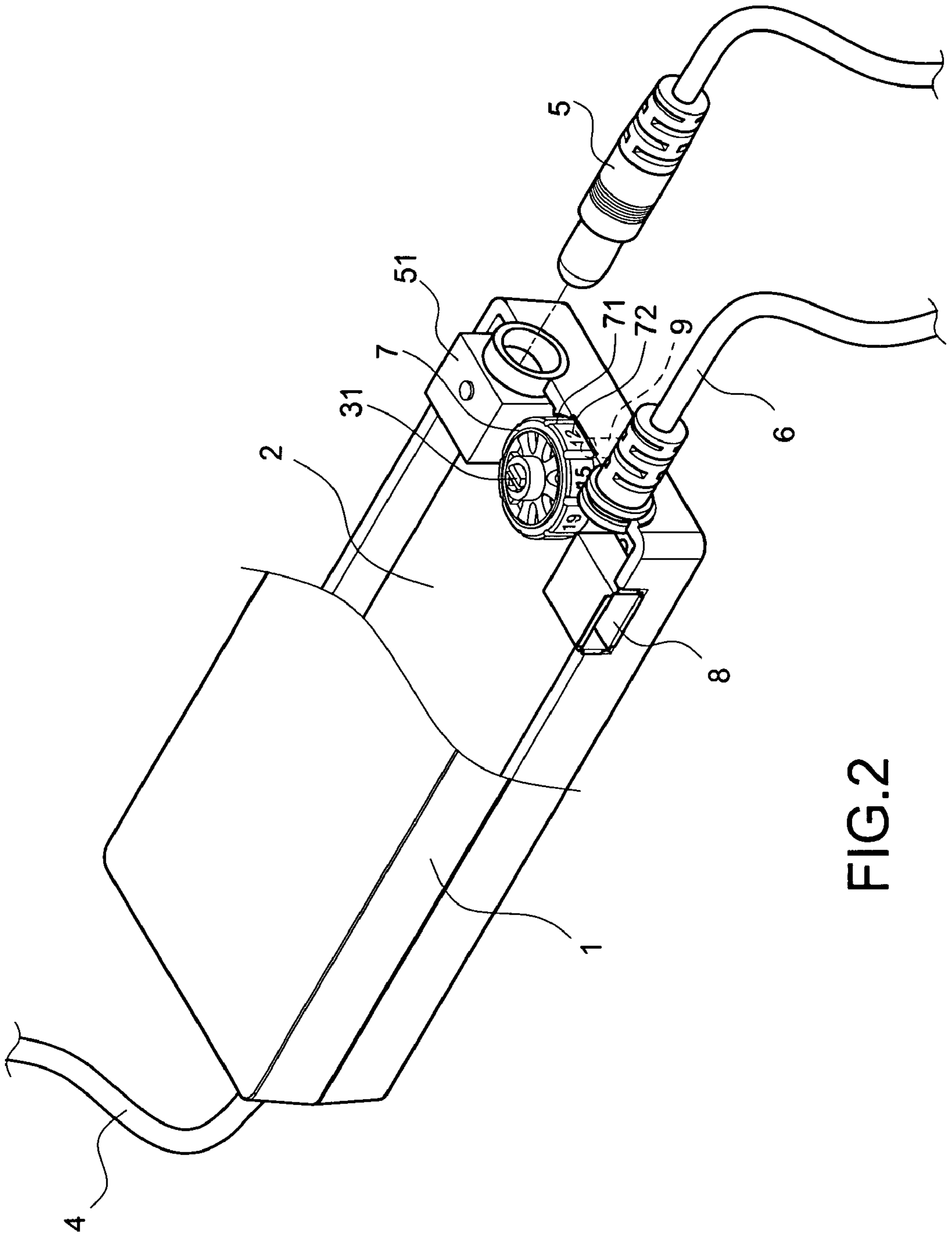
FIG. 2 is a schematic view showing the voltage-adjusting means of the power supply of the present invention.
Figure 3:
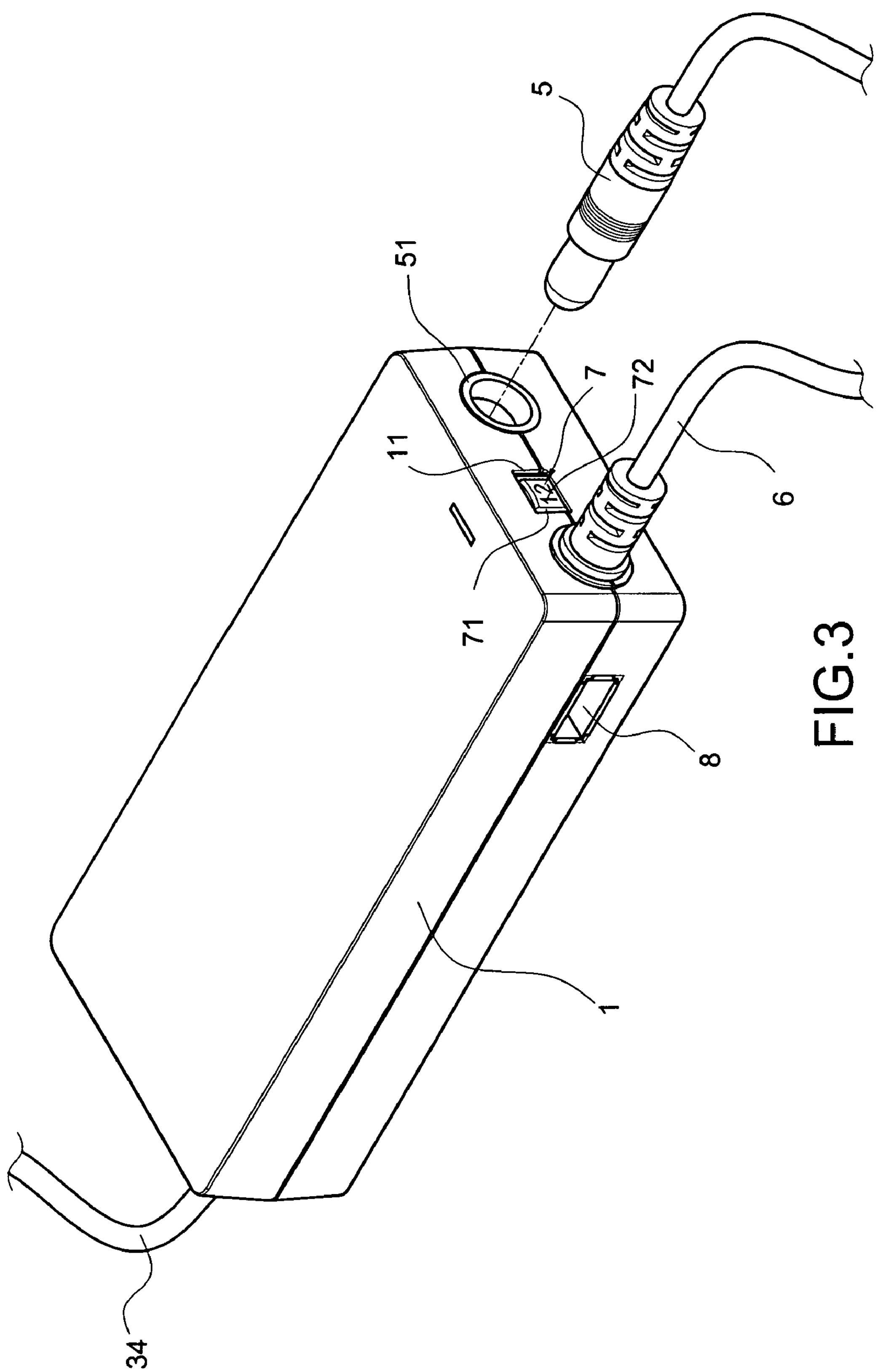
FIG. 3 is a schematic view showing external appearance of the voltage-adjusting means of the power supply of the present invention.
Figure 4:
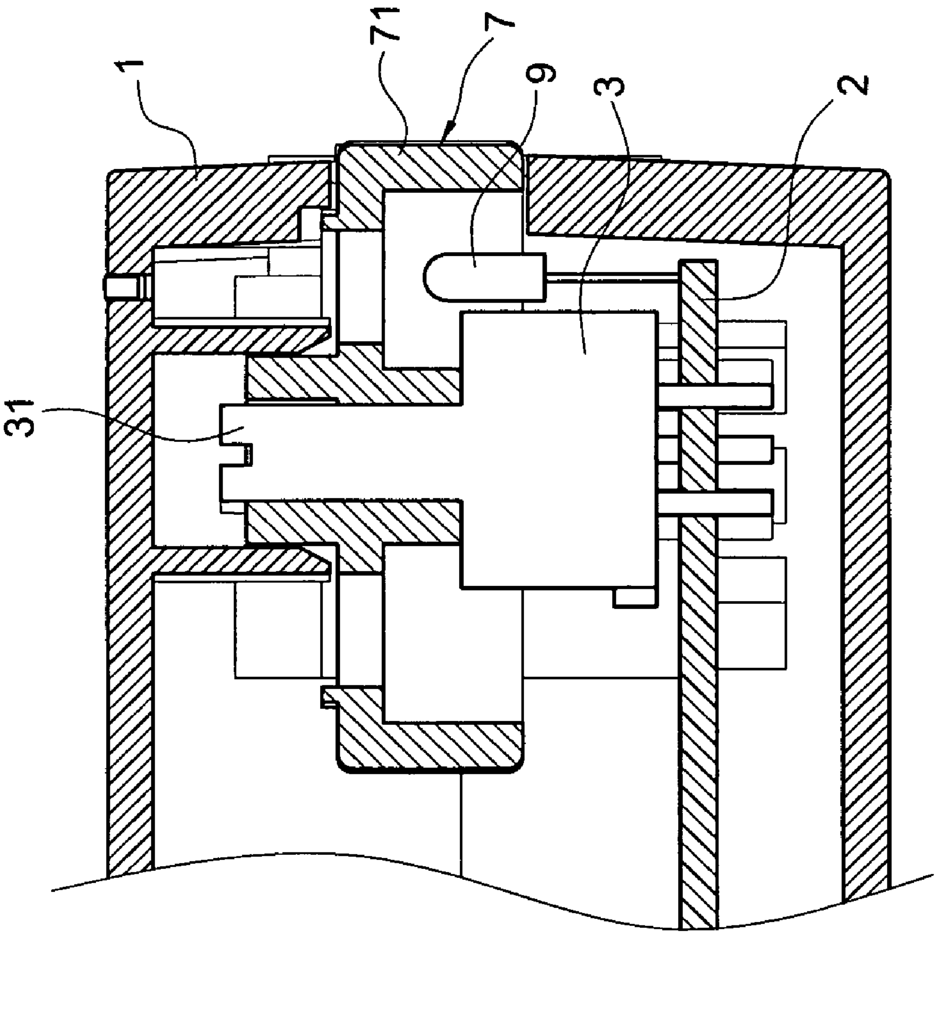
FIG. 4 is a side cross-sectional view of FIG. 3.

Please refer to FIGS. 2 to 4. As shown in these figures, the present invention provides a power supply with adjustable outputted voltage. The power supply has a casing 1. The interior of the casing 1 is provided with a circuit board 2 having AC/DC power input processing circuit in which only AC (or DC) exists or both AC and DC exist simultaneously. In the present invention, a power supply having two input voltages is illustrated. The circuit board 2 is electrically connected with a voltage-adjusting knob (rotary switch) 3, an AC power input cable 4, a DC power socket 51, a DC power input cable 5, a DC power output cable 6 and a DC power output connector 8.

The voltage-adjusting knob 3 is a voltage adjuster for the AC/DC power processing circuit. A rotary rod 31 of the voltage-adjusting knob 3 is provided with a rotary wheel 7. The surface of the rotary wheel 7 has a plurality of protrusions 71. The circuit board 2 under the rotary wheel 7 is electrically connected with a light-emitting body 9. The light-emitting body 9 is a light-emitting diode according to a preferred embodiment of the present invention. The light-emitting body 9 is used to display the operating state and voltage numerals of the power supply. The surface of the protrusion 71 has a voltage numeral 72. The protrusion 71 and the voltage numeral 72 are displayed in the window 11 of the casing 1. When the user adjusts the voltage, he/she only needs to use fingers to push the surface of the rotary wheel 7 to rotate, so that the numerals on the surface of the rotary wheel can be changed correspondingly, thereby adjusting the voltage.

Further, during the adjustment of voltage, only one voltage numeral is displayed each time. Therefore, the user may not read the wrong numeral, thereby adjusting the desired voltage output correctly.

Figure 5:
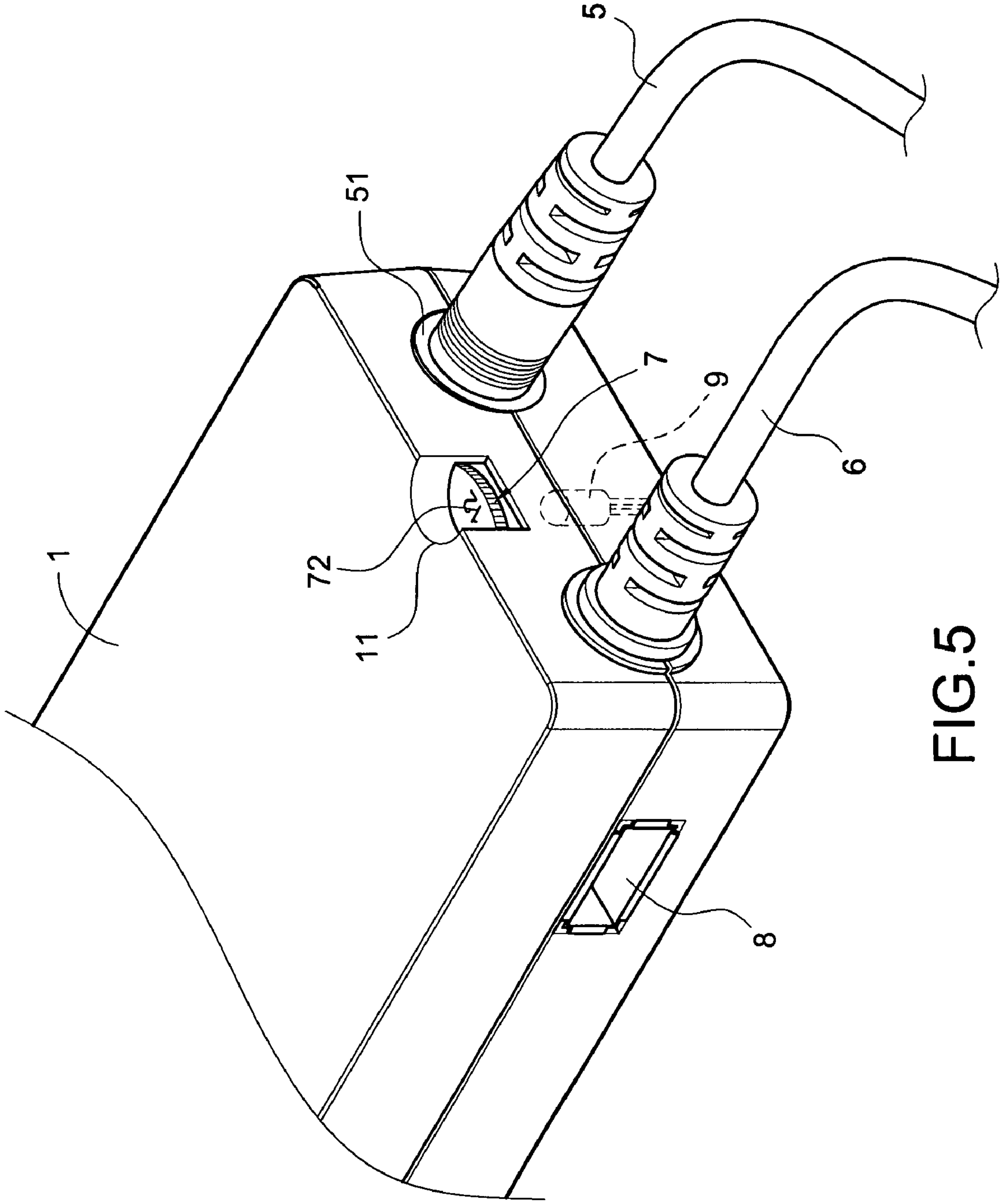
FIG. 5 is a schematic view showing another voltage-adjusting means of the power supply of the present invention.

Please refer to FIG. 5, which is a schematic view showing another voltage-adjusting means of the power supply of the present invention. As shown in this figure, the voltage-adjusting numeral 72 can be printed at a position above the side surface of the rotary wheel 7. The voltage-adjusting numeral 72 is displayed in the window 11 that is made to show the top surface and side surface of the casing 1. The underside of the rotary wheel 7 is provided with a light-emitting body 9. The light-emitting body 9 is implemented with a light-emitting diode. During the adjustment of voltage, the user uses fingers to touch the teeth on the side surface of the rotary wheel 7, thereby rotating the rotary wheel 7 so as to adjust the voltage.

Figure 6:
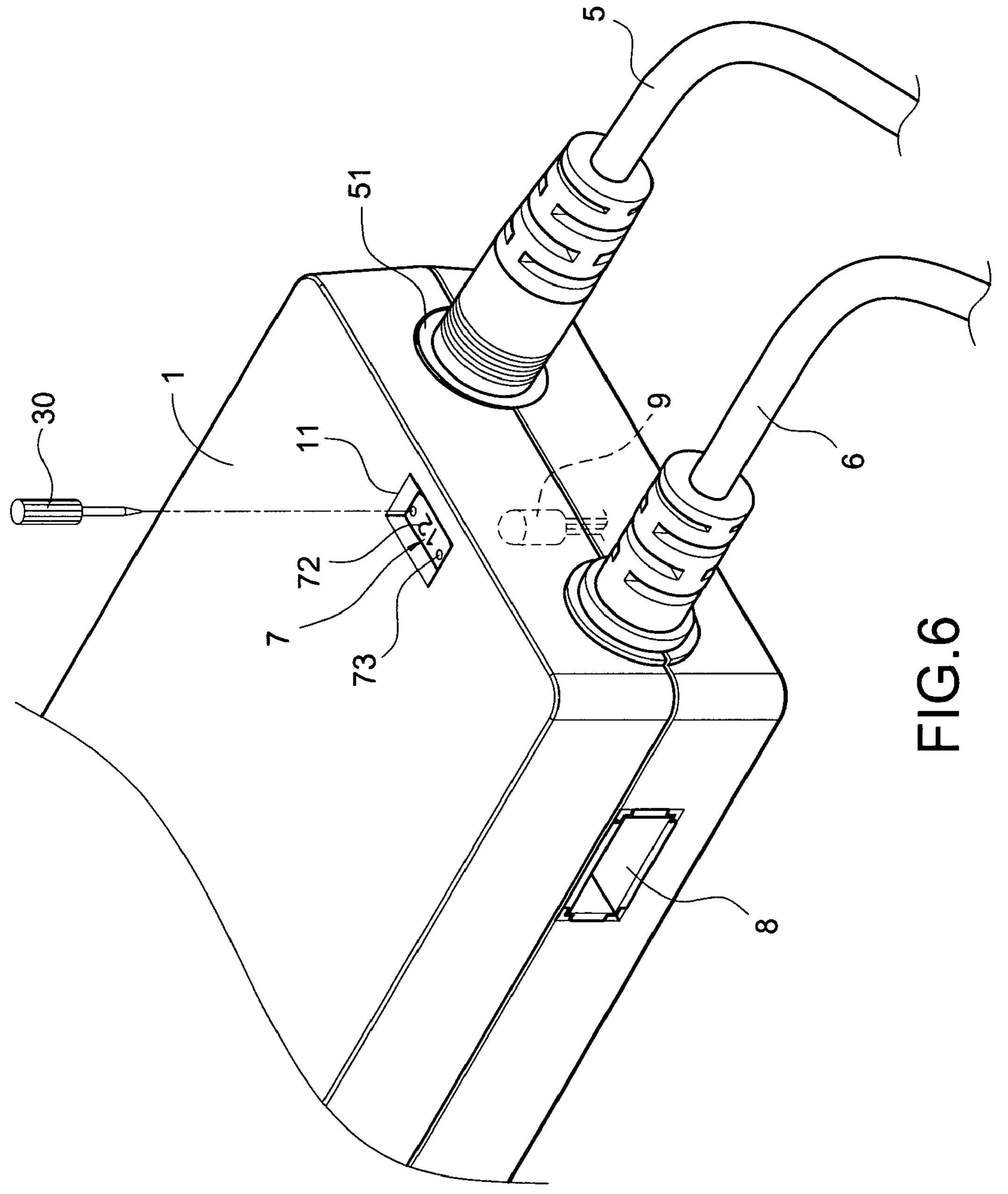
FIG. 6 is a schematic view showing a further voltage-adjusting means of the power supply of the present invention.

Please refer to FIG. 6, which is a schematic view showing a further voltage-adjusting means of the power supply of the present invention. As shown in this figure, the voltage-adjusting numerals 72 can be printed on the side surface of the rotary wheel 7. The voltage-adjusting numerals 72 are displayed in the window 11 that is provided on the top surface of the casing 1. The underside of the rotary wheel 7 is provided with a light-emitting body 9. The light-emitting body 9 is, for example, a light-emitting diode. At least one pit 73 is defined beside each voltage-adjusting numeral 72, where two pits 73 are shown in FIG. 6 and defined on two sides of the voltage-adjusting numeral 72. During the adjustment of voltage, the user uses a pointed piece 30 inserting into the pit 73, thereby turning the rotary wheel 7 so as to adjust the voltage.

Figure 7:
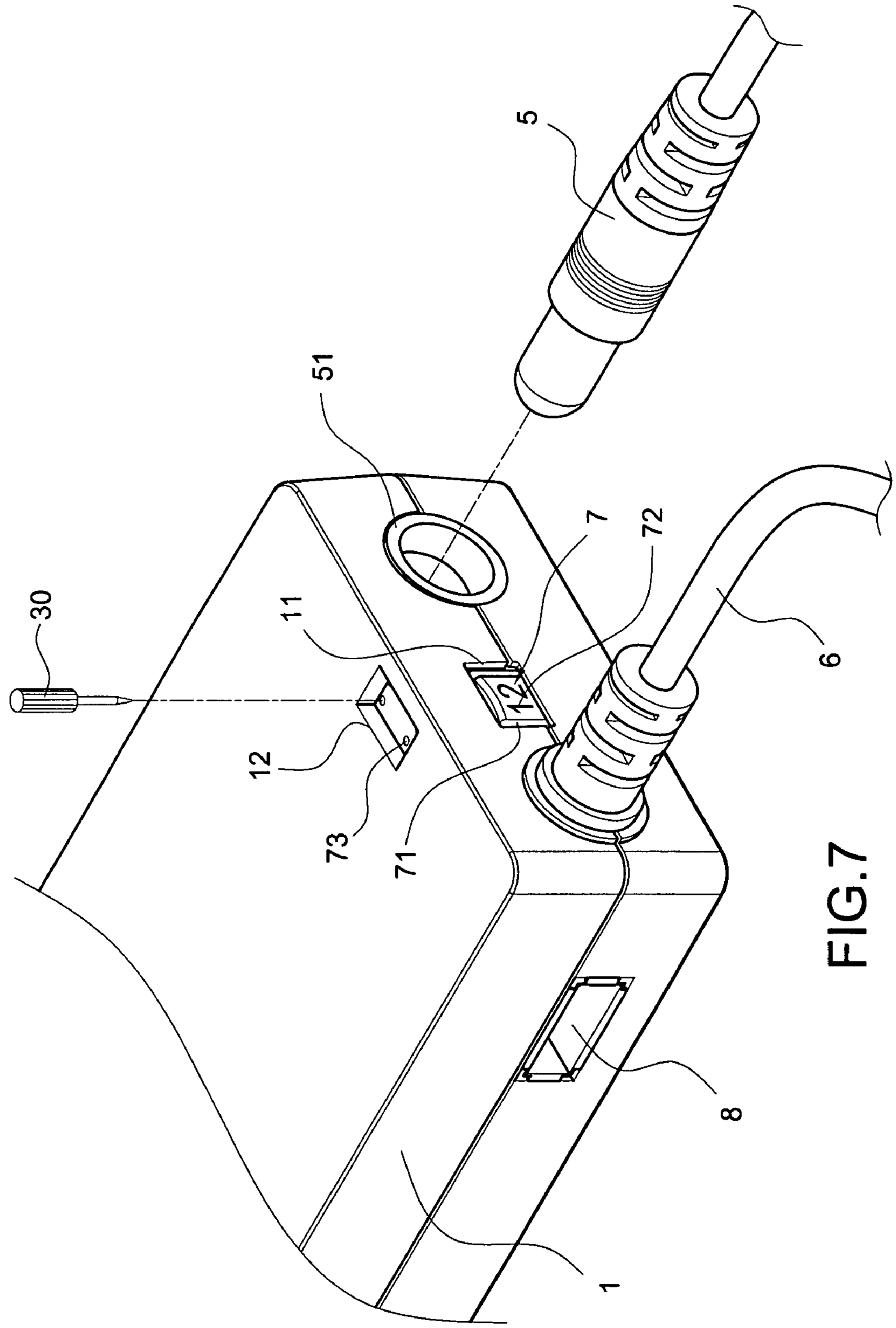
FIG. 7 is a schematic view showing still a further voltage-adjusting means of the power supply of the present invention.

Please refer to FIG. 7, which is a schematic view showing still a further voltage-adjusting means of the power supply of the present invention. The surface of the casing 1 is provided with a window 12 at a position corresponding to the voltage-adjusting numeral 72, so that the other side surface of the rotary wheel 7 is displayed in the window. The side surface of the rotary wheel is provided with a pit 73. In adjusting the voltage, the user inserts a pointed article 30 into the pit 73 to poke the rotary wheel 7, thereby rotating the rotary wheel to adjust the voltage.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power supply with adjustable outputted voltage, comprising:

a casing provided thereon with a window;

a circuit board provided inside the casing, the circuit board electrically connected a power input processing circuit;

a voltage-adjusting knob electrically connected to the circuit board and having a rotary rod thereon; and a rotary wheel connected on the rotary rod and having a plurality of voltage-adjusting numerals thereon, the voltage-adjusting numerals being located to correspond to the window and being displayed in the window.

2. The power supply with adjustable outputted voltage according to claim 1, wherein the circuit board is electrically connected with an AC power input cable, a DC power input socket and a DC power output cable.

3. The power supply with adjustable outputted voltage according to claim 1, wherein the circuit board is electrically connected with an AC power input cable and a DC power output cable.

4. The power supply with adjustable outputted voltage according to claim 1, wherein the circuit board is electrically connected with a DC power input socket and a DC power output cable.

5. The power supply with adjustable outputted voltage according to claim 1, wherein the voltage-adjusting numerals are printed on a side surface of the rotary wheel.

6. The power supply with adjustable outputted voltage according to claim 1, wherein at least one pit is defined beside each of the voltage-adjusting numerals on the side surface of the rotary wheel.

7. The power supply with adjustable outputted voltage according to claim 1, wherein the voltage-adjusting numerals are printed on a side surface of the rotary wheel.

8. The power supply with adjustable outputted voltage according to claim 7, wherein the side surface of the rotary wheel has a plurality of protrusions thereon, and each protrusion has a voltage-adjusting numeral thereon.

9. The power supply with adjustable outputted voltage according to claim 7, further comprising a window, the window exposing the side surface of the rotary wheel outside.

10. The power supply with adjustable outputted voltage according to claim 9, wherein the side surface of the rotary wheel is provided thereon with a pit.

11. The power supply with adjustable outputted voltage according to claim 1, wherein the circuit board is electrically connected to a light-emitting body, and the light-emitting body is located beside the rotary wheel for displaying an operating state and a corresponding voltage-adjusting numeral of the power supply.

12. The power supply with adjustable outputted voltage according to claim 11, wherein the light-emitting body is a light-emitting diode.

* * * * *